US009025608B2

(12) United States Patent
Chen et al.

(10) Patent No.: US 9,025,608 B2
(45) Date of Patent: May 5, 2015

(54) ROUTE SWITCHING DEVICE AND DATA CASHING METHOD THEREOF

(75) Inventors: Hongqi Chen, Shenzhen (CN); Chang Zhou, Shenzhen (CN)

(73) Assignee: ZTE Corporation, Shenzhen, Guangdong Providence (CN)

( * ) Notice: Subject to any disclaimer, the term of this patent is extended or adjusted under 35 U.S.C. 154(b) by 576 days.

(21) Appl. No.: 13/393,632

(22) PCT Filed: May 24, 2010

(86) PCT No.: PCT/CN2010/073145
§ 371 (c)(1),
(2), (4) Date: Mar. 1, 2012

(87) PCT Pub. No.: WO2011/026353
PCT Pub. Date: Mar. 10, 2011

(65) Prior Publication Data
US 2012/0163394 A1 Jun. 28, 2012

(30) Foreign Application Priority Data

Sep. 2, 2009 (CN) .......................... 2009 1 0167277

(51) Int. Cl.
G06F 13/28 (2006.01)
H04L 29/08 (2006.01)
H04L 12/861 (2013.01)
(52) U.S. Cl.
CPC ........ *H04L 67/2842* (2013.01); *H04L 49/9042* (2013.01); *H04L 49/9078* (2013.01)
(58) Field of Classification Search
None
See application file for complete search history.

(56) References Cited

U.S. PATENT DOCUMENTS

| 6,714,562 | B1 | 3/2004 | Calvignac et al. |
| 8,234,478 | B1 * | 7/2012 | Roberts et al. ................. 711/167 |
| 2002/0067650 | A1 * | 6/2002 | Tanaka et al. ................. 365/222 |
| 2003/0200404 | A1 * | 10/2003 | Wicki et al. .................... 711/156 |

(Continued)

FOREIGN PATENT DOCUMENTS

| CN | 1602475 A | 3/2005 |
| CN | 1622628 A | 6/2005 |

(Continued)

OTHER PUBLICATIONS

International Search Report for PCT/CN2010/073145 dated Aug. 6, 2010.

*Primary Examiner* — Hassan Phillips
*Assistant Examiner* — Duc Duong
(74) *Attorney, Agent, or Firm* — Ling Wu; Stephen Yang; Ling and Yang Intellectual Property

(57) ABSTRACT

The present invention discloses a routing and switching device and a data caching method thereof. The method includes: a routing and switching device, when receiving a data packet, and if the routing and switching device inquires that a data caching state of an exterior cache is that there are data slice row addresses not fully filled and continuous space in the data slice row addresses not fully filled is enough to store all the data slices of the data packet, then writing all the data slices of the data packet into the data slice row addresses not fully filled, storing packet information of the data packet and the written data slice row addresses, and updating the data caching state of the exterior cache. The present invention enhances the utilization rate of the memory bandwidth. In addition, the present invention is also easy to be applied in other relevant data caching managements.

12 Claims, 3 Drawing Sheets

(56) References Cited

U.S. PATENT DOCUMENTS

| | | |
|---|---|---|
| 2005/0213571 A1 | 9/2005 | Barrack et al. |
| 2006/0036705 A1 | 2/2006 | Musoll et al. |
| 2009/0006758 A1* | 1/2009 | Chung et al. .................. 711/129 |
| 2010/0174883 A1* | 7/2010 | Lerner et al. ..................... 712/11 |
| 2010/0231600 A1* | 9/2010 | Kaufman et al. ............. 345/545 |
| 2011/0078343 A1* | 3/2011 | Resch et al. .................... 710/33 |
| 2013/0283125 A1* | 10/2013 | Gladwin et al. .............. 714/758 |

FOREIGN PATENT DOCUMENTS

| | | |
|---|---|---|
| CN | 1874490 A | 12/2006 |
| CN | 101645846 A | 2/2010 |
| DE | 19943174 A1 | 9/1998 |

* cited by examiner

| Stream 1 write pointer |
| Stream 1 read pointer |
| Stream 2 write pointer |
| Stream 2 read pointer |
| . |
| . |
| . |
| . |
| . |
| Stream k-1 write pointer |
| Stream k-1 read pointer |
| Stream k write pointer |
| Stream k read pointer |

ROUTE SWITCHING DEVICE AND DATA CASHING METHOD THEREOF

TECHNICAL FIELD

The present invention relates to the field of network communication, and particularly to a routing and switching device and a data caching method thereof.

BACKGROUND OF THE RELATED ART

In the routing and switching device, a data packet is usually divided into a plurality of data slices according to a certain rule, and when outputting the data packet, the plurality of divided data slices are combined to recover to the original data packet. The length of the data slice divided from the data packet should be relevant to factors such as the minimum length of the data packet, the processing speed of the interior packet, the data bit width of the memory, etc. Queue storage usually uses the manner of dynamically storing different queue storage areas, and under the condition that the bandwidth utilization rate of the memory is taken into consideration, queue data which needs to be cached may be put into any idle areas.

With the development of network technology, the bandwidth of dynamic data caching in the routing and switching device becomes larger and larger; due to the existence of timing requirements such as pre-charge, column activation and automatic refresh of the dynamic memory, the bandwidth utilization rate of the memory becomes the first problem which should be taken into consideration in data caching. However, the increase of port speed and the change of the data packet length cause the timing control of data caching to become complicated. Accordingly, the actual data bandwidth of the memory becomes an important reference for selecting the data caching memory devices in the routing and switching device.

CONTENT OF THE INVENTION

In the application of data caching, the addresses of read and write operations being irrelevant and the number of data slices with different packet length being unequal cause that the addresses of different read operations are irrelevant, thus resulting in that it is difficult to enhance the bandwidth utilization rate.

The technical problem to be solved in the present invention is to propose a routing and switching device and a data caching method thereof so as to enhance the storage bandwidth utilization rate.

In order to solve the above technical problem, the present invention provides a data caching method, and the method includes:

a routing and switching device, when receiving a data packet, and if the routing and switching device inquires that a data caching state of an exterior cache is that there are data slice row addresses not fully filled and continuous space in the data slice row addresses not fully filled is enough to store all the data slices of the data packet, then writing all the data slices of the data packet into the data slice row addresses not fully filled, storing packet information of the data packet and the written data slice row addresses, and updating the data caching state of the exterior cache.

Preferably, in the step of the routing and switching device, when receiving the data packet, writing all the data slices of the data packet into the data slice row addresses not fully filled, if the routing and switching device inquires that the data caching state of the exterior cache is that there are null and continuous data slice row addresses, then the routing and switching device writes all the data slices of the data packet into the null and continuous data slice row addresses.

Preferably, in the step of writing all the data slices of the data packet into the data slice row addresses not fully filled, the routing and switching device continuously writes the data slices of the data packet into the data slice row addresses by continuous burst write operations, wherein, when the number of data slices of the data packet exceeds the maximum number of continuous burst write operations, the routing and switching device carries out burst write operations according to the maximum number of continuous burst write operations in the process of writing data each time, until all the data slices of the data are written into.

Preferably, the method further includes:

the routing and switching device, when receiving a read operation, reading the data packet from the exterior cache and updating the data caching state of the exterior cache according to the packet information of the data packet to be read and the written data slice row addresses.

Preferably, in the step of reading the data packet from the exterior cache, the routing and switching device reads the data slices of the data packet by continuous burst read operations, wherein, when the number of data slices of the data packet exceeds the maximum number of continuous burst read operations, the routing and switching device reads out all the data slices of the data packet for one time, and when reading data next time, subtracts the number of burst read operations which exceed the maximum number of continuous burst read operations in the process of the current reading data.

In order to solve the above technical problem, the present invention provides a routing and switching device which includes a caching control module and a data caching list module, wherein:

the caching control module is configured to: when receiving a data packet, if inquiring that a data caching state of an exterior cache is that there are data slice row addresses not fully filled and continuous space in the data slice row addresses not fully filled is enough to store all the data slices of the data packet, then write all the data slices of the data packet into the data slice row addresses not fully filled, and sending packet information of the data packet and the written data slice row addresses to the data caching list module; and the data caching list module is configured to: store the packet information of the data packet and the written data slice row addresses which are written into the exterior cache and sent by the caching control module, and update the data caching state of the exterior cache in real time.

Preferably, the caching control module is configured to: if inquiring the data caching state of the exterior cache is that there are null and continuous data slice row addresses, then write all the data slices of the data packet into the null and continuous data slice row addresses.

Preferably, the caching control module is configured to: continuously write the data slices of the data packet into the data slice row addresses by continuous burst read operations, wherein, when the number of data slices of the data packet exceeds the maximum number of continuous burst read operations, the caching control module carries out burst write operations according to the maximum number of continuous burst read operations in the process of writing data each time, until all the data slices of the data are written into.

Preferably, the caching control module is configured to: when receiving a read operation, inquire for the packet information of the data packet to be read and the written data slice row addresses from the data caching list module, read the data packet from the exterior cache, and send a reading result to the data caching list module; and the data caching list module is further configured to: receive the reading result sent by the caching control module, and update the data caching state of the exterior cache according to the reading result.

Preferably, the caching control module is configured to: read the data slices of the data packet by continuous burst read operations, wherein, when the number of data slices of the data packet exceeds the maximum number of continuous burst read operations, the caching control module reads out all the data slices of the data packet for one time, and when reading data next time, subtracts the number of burst read operations which exceed the maximum number of continuous burst read operations in the process of the current reading data.

Compared to the existing software implementation technology, the technical solution of the present invention is directly applied in hardware devices and easy to be transplanted in the hardware devices, and compared to the existing hardware implementation technology, the design of hardware structure takes the data packet caching management into consideration directly, which enhances the bandwidth utilization rate of the memory bandwidth. In addition, the code transplantation with fixed interface in the technology of the present invention is easy to be applied in other relevant data caching managements.

PREFERRED EMBODIMENTS OF THE PRESENT INVENTION

Figures 1, 2:
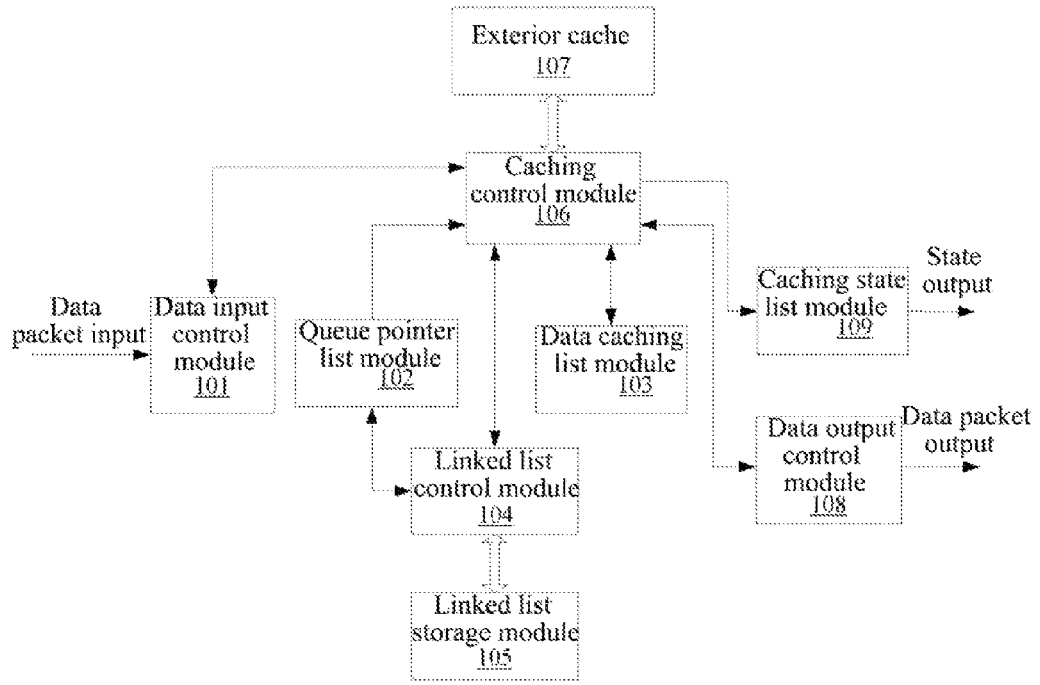
FIG. 1 is a structural schematic diagram of a data caching system in the present embodiment.
FIG. 2 is a schematic diagram of a list structure of a queue pointer list in the system shown in FIG. 1.

The main idea of the present invention is that a data packet can be controlled in a routing and switching device according to the following process:

after the routing and switching device for receiving identifies the inputted data packet, the data packet is divided into data slices with equal byte length, and the caching of these data slices are maintained by a linked list, wherein the address of the linked list corresponds to the caching physical position one-to-one. Before the caching data is written into the memory, the data slices are stored temporarily, and a write operation is carried out by inquiring for the data caching state of an exterior cache in a data caching list. For example, when the data caching state is that there is continuous space of null data slice row addresses, then all the data slices of the data packet can be placed into the exterior cache by continuous burst write operations; and when the data caching state is that there are data slice row addresses not fully filled and the continuous space in the data slice row addresses is enough to write all the data slices of the data packet, then all the data slices of the data packet can be inserted into continuous null address slices in the data slice row addresses.

Thereinto, if the number of the data slices of the data packet exceeds the maximum number of continuous burst write operations, then in the process of writing data for one time, the continuous burst write operations are carried out according to the maximum number of continuous burst write operations, and in the process of writing data next time, the continuous burst write operations are continued to complete the writing of the remainder data slices. At the same time, during the write operations of the continuous entire data packet, it is ensured that the write operation is not carried out in the address space of cross-column addresses, because in this way, the performance of utility of data read and write bandwidth can be improved. After the data packet is written into, a queue pointer list, a data caching list and a caching state list also need to be updated, and the linked list is updated by a linked list control.

When outputting data (i.e., reading the data packet from the exterior cache), an exterior port reshaping and traffic control module controls the readout of queue data by the caching state of each queue in the caching state list. When reading out the data in the cache, it is required to read out all the data slices of an entire data packet. If the number of data slices does not exceed the number of continuous burst read operations, then operation is normal, otherwise, all the data slices in the entire data packet are read out for one time, the number of redundant burst read operations this time (i.e. the number exceeding the maximum number of continuous burst read operations) is subtracted during the next read operation, and the corresponding data in the queue pointer list, the data caching list, and the caching state list is updated.

Thereinto, when reading data next time, subtracting the number of burst read operations which exceeds the maximum number of continuous burst read operations in the process of reading data this time is because that the number limit of output operations (reading data) each time is the number of burst operations, and the number of burst operations is usually equal to the maximum number of continuous burst read operations (which is a constant, such as 8). If the packet length read out during this read operation is greater than the maximum number of continuous burst read operations, then all the data slices of the entire data packet are still read out for one time (in which, the packet length by executing readout is greater than 8 burst operations), and during the next read operation, the number of this redundant burst read operations is subtracted from the maximum number of continuous burst read operations, which acts as the number of burst operations. For example, the maximum number of continuous burst read operations is 8, and since the number of data slices exceeds the number of continuous burst read operations, such as 9, then during this data reading, all the data slices of the entire data packet are read out for one time, but during the next data reading, the number of burst operations is 8−(9−8)=7.

Hereinafter, the technical solution of the present invention will be further illustrated in detail in combination with the accompanying drawings and specific embodiments.

A routing and switching device, as shown in FIG. 1, mainly includes a data input control module 101, a queue pointer list module 102, a data caching list module 103, a linked list control module 104, a linked list storage module 105, a caching control module 106, a data output control module 108 and a caching state list module 109. The functions of each module will be described in the following.

The data input control module 101 is configured to: receive a data packet inputted from a port of a routing and switching device, and after identifying the data packet, send the data packet and the packet information of the data packet (information such as packet length, queue number, etc.) to the caching control module 106;

the caching control module 106 is configured to: divide the data packet sent by the data input control module 101 into data slices, and organize the write timing of the exterior cache (i.e., 107 in FIG. 1) by calling the data caching state information of an exterior cache in the data caching list module 103 and referring to the write pointer information of relevant queues in the queue pointer list module 102; and carry out a read operation on the entire data packet in the exterior cache, send a read and write operation result to the data caching list module 103 and caching state list module 109 to update relevant information, and send the update information of the linked list in the linked list storage module 105 to the linked list control module 104;

wherein, the caching control module 106 calls the information in the data caching list module 103, acquires a continuous address space for all the data slices of each entire data packet, writes the data into the exterior cache after the number of the cached data slices reaches the number of continuous burst operations, updates the relevant queue pointer list, data caching list and caching state list, and send the linked list information to the linked list control module 104; and the data caching list module 103 acquires the number of data slices of the data packet when outputting the data packet, controls the readout of the data of the exterior cache 107 (i.e., the cache for caching the data packet), and updates the queue pointer list, the data caching list and the caching state list;

in the read and write operations of the exterior data packet, the read and write data packet control of the caching control module 106 is equally divided by the number of continuous burst operations, the write operation is performed according to the number of continuous burst operations, and if the number of the data slices of the data packet exceeds the number of burst operations, then it only needs to ensure that the storage addresses of the data slices are continuous. The read operation takes the following into consideration: if the number of entire data packet exceeds the number of continuous burst operations, then firstly the readout of all the data slices of the data packet is completed, and the exceeding number this time is subtracted from the number of continuous burst during the next read operation.

The linked list control module 104 is configured to: when writing the data packet, update the pointing information of data slice caching linked list into the linked list storage module 105, update the write pointer of the queue into the corresponding position in the queue pointer list module 102, and when reading out the data packet, update into the read pointer in the queue pointer list module 102 the contents in the linked list of the queue in the linked list control module 104 mapped by the read operation to which the read pointer of the queue pointer list module 102 points.

The queue pointer list module 102 is configured to: maintain the queue pointer list, update the write pointer of the corresponding queue when inputting the data (i.e. update it to the next data slice position of the current write position), and when outputting the data, update the read pointer of the corresponding queue into the corresponding position of the linked list (the next pointed data slice position). If the read pointer position exceeds the write pointer position, then it indicates that the queue is read to be null, and the read pointer does not need to be updated; and if it is the first time to write data into the queue, then the read pointer and write pointer are updated, in which the read pointer is the write position, and the write pointer is the read pointer plus 1.

Thereinto, the list structure of the queue pointer list in this embodiment is shown in FIG. 2, which mainly includes the read and write pointers of all the queues, wherein, the read and write pointers and the addresses of the linked list storage module 105 correspond to the caching positions in the exterior cache one-to-one.

The data caching list module 103 is configured to: maintain the data caching list, and the bit position in the data caching list corresponds to the sequence number of the data slice in the exterior cache 107 one-to-one. When writing the data, the acquisition of write addresses and the arrangement of write timing need to refer to the caching information in the data caching list.

Figure 3:
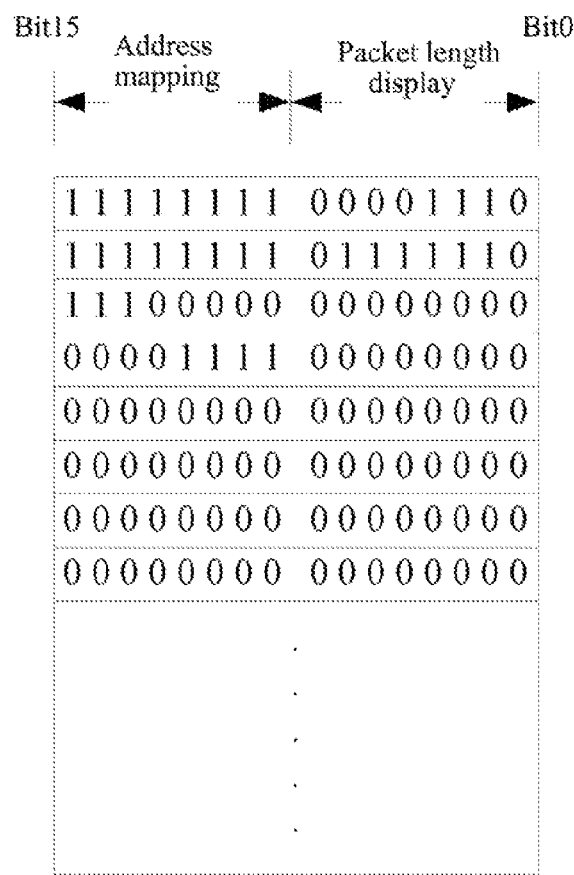
FIG. 3 is a structural schematic diagram of a data caching list in the system shown in FIG. 1.

Thereinto, the structure of the data caching list is shown in FIG. 3. The high 8 bits of each position in the data caching list are mapped as a storage address, and value 1 represents having the stored data; low 8-bit data indicates the data slice content of the data packet, which corresponds to the high 8 bits one-to-one; and value 0 represents the first data slice of the data packet, and value 1 represents the continuous data slice of the data packet.

Figure 4:
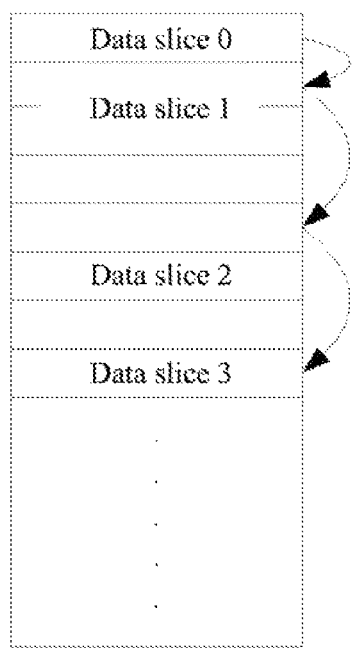
FIG. 4 is a schematic diagram of a linked list manner of caching data slices in the system shown in FIG. 1.

As shown in FIG. 4, it is an implementation of a linked list of data slice caching. The position pointing in the data slice linked list includes the linked list pointing of all the queues. The linked list content of each queue in the entire list are completely independent from each other.

The caching state list module 109 is configured to: maintain the caching states of all the queues, when inputting or outputting the data packet, update the number of data slices for the corresponding operation into the caching state list, and provide an exterior inquiry interface of the caching state list.

The data output control module 108, is a control module of the exterior interface, and is configured to: identify the exterior read operation and send the operation message to the caching control module 106.

Figure 5:
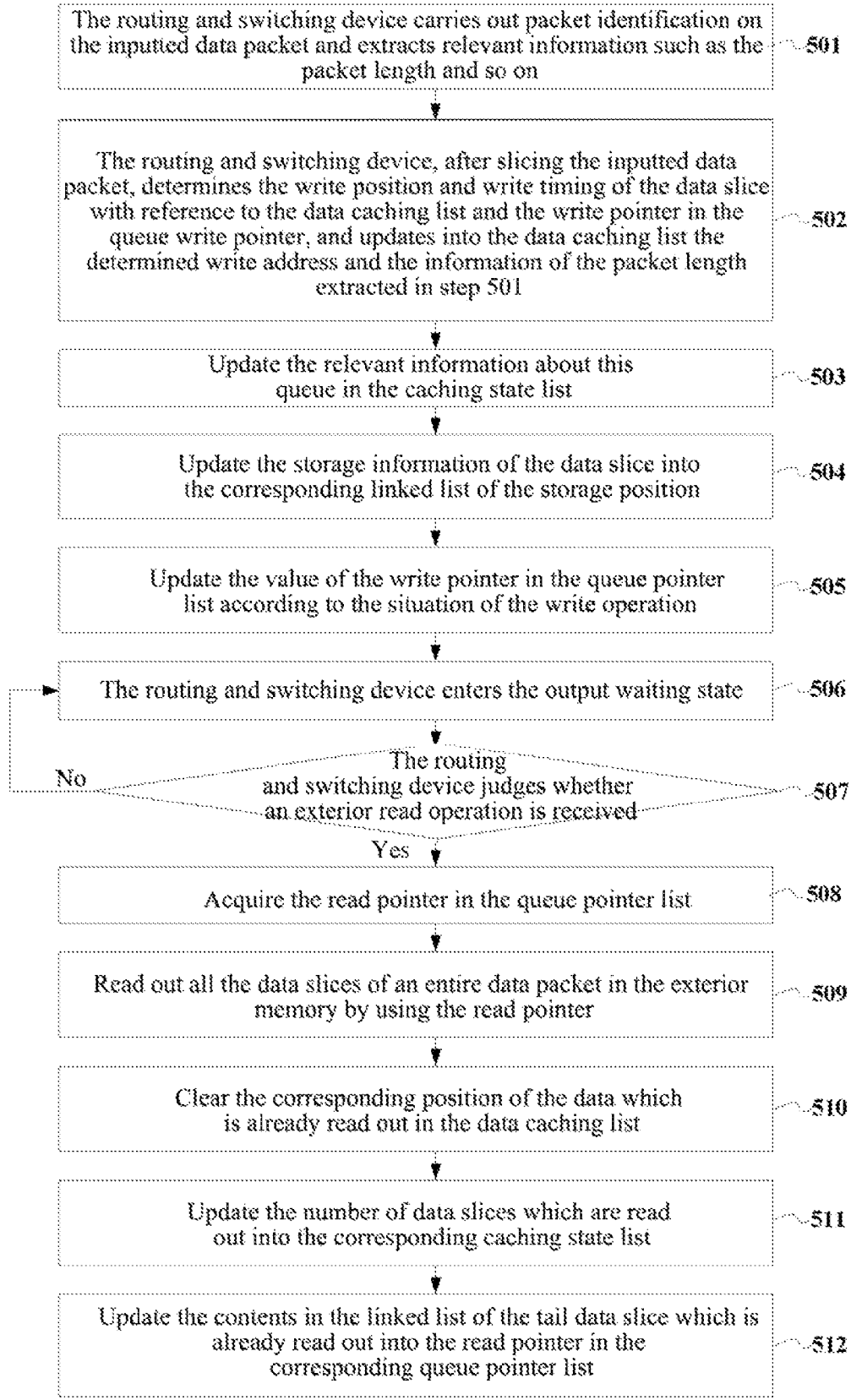
FIG. 5 is a flow chart of a data caching management in the present embodiment.

Hereinafter, the process of the above device implementing data caching will be described, and as shown in FIG. 5, it includes the following steps.

In step 501, the routing and switching device carries out the packet identification on the inputted data packet, and extracts relevant information such as packet length and so on.

In step 502, the routing and switching device, after slicing the inputted data packet, determines the write position and the write timing of the data slice with reference to the data caching list and the write pointer in the queue write pointer, and updates into the data caching list the determined write address and the packet length information extracted in step 501.

In this embodiment, the structure of the data caching list is shown in FIG. 3. The high 8 bits of each position in the data caching list are mapped as a storage address, value 1 represents having stored data (i.e., there is a data slice written into), and value 0 represents that there is no data slice written into; and low 8-bit data indicates the number of data slices of the data packet (i.e., the information of packet length), value 0 represents the first data slice of the data packet, and value 1 represents the continuous data slice of the data packet, wherein the low 8 bits correspond to the high 8 bits one-to-one.

In step 503, the relevant information of the queue in the caching state list is updated (i.e., update the number of data packets in the queue).

In step 504, the storage information of the data slice is updated into the linked list corresponding to the storage position; and in this step, the linked list of the storage position corresponding to the storage information of the data slice is shown in FIG. 4.

In step 505, the value of the write pointer in the queue pointer list is updated according to the situation of the write operation.

In step 506, the routing and switching device enters the output waiting state.

In step 507, the routing and switching device judges whether an exterior read operation is received, if yes, then step 508 is performed, otherwise, the flow returns to step 506.

In step 508, the read pointer in the queue pointer list is acquired.

In step 509, all the data slices of an entire data packet in the exterior memory are read out by using the read pointer; and in this step, the routing and switching device continuously reads all the data slices of the data packet from corresponding addresses of the exterior cache according to the packet length information and the write position of the data packet in the data caching list; wherein, the routing and switching device reads out for one time all the data slices of the data packet by continuous burst read operations, and during the next read operation, subtracts the number of the current redundant burst read operations (i.e., the number exceeding the maximum number of continuous burst read operations).

In step 510, the corresponding position of the data which is already read out in the data caching list is cleared (i.e., update the data caching state of the exterior cache in the data caching list).

In step 511, the number of data slices which are read out is updated into the corresponding caching state list.

In step 512, the content in the linked list of tail data slice which is already read out is updated into a read pointer in the corresponding queue pointer list.

It can be seen from the above embodiments that the technical solution of the present invention increases a plurality of burst operations of read and write in the data operation, thereby improving the bandwidth utility of the routing and switching device. Furthermore, the technical solution of the present invention improves the write timing of the data by burst continuous operations, and the data address continuous burst operations of the read operation of a single data packet also enhances the bandwidth utility of the read operation.

Although the present invention is described in combination with specific embodiments, those skilled in the art can make modifications and changes without departing from the spirit or scope of the present invention. Such modifications and changes are viewed as being within the scope of the present invention and the scope of the appended claims.

INDUSTRIAL APPLICABILITY

The present invention provides a routing and switching device and a data caching method thereof, which can be directly applied in hardware devices and be easy to be transplanted in the hardware devices, and the design of the hardware structure takes the data packet caching management into consideration directly, which enhances the utilization rate of the memory bandwidth. In addition, the present invention is also easy to be applied in other relevant data caching managements.

What we claim is:

1. A data caching method, comprising:
a routing and switching device, when receiving a data packet, and if the routing and switching device inquires that a data caching state of an exterior cache is that there are data slice row addresses not fully filled and continuous space in the data slice row addresses not fully filled is enough to store all the data slices of the data packet, then writing all the data slices of the data packet into the data slice row addresses not fully filled, storing packet information of the data packet and the written data slice row addresses, and updating the data caching state of the exterior cache, wherein:

in the step of writing all the data slices of the data packet into the data slice row addresses not fully filled, the routing and switching device continuously writes the data slices of the data packet into the data slice row addresses by continuous burst write operations, wherein, when the number of data slices of the data packet exceeds the maximum number of continuous burst write operations, the routing and switching device carries out burst write operations according to the maximum number of continuous burst write operations in the process of writing data each time, until all the data slices of the data are written into.

2. The method according to claim 1, wherein:
in the step of the routing and switching device, when receiving the data packet, writing all the data slices of the data packet into the data slice row addresses not fully filled, if the routing and switching device inquires that the data caching state of the exterior cache is that there are null and continuous data slice row addresses, then the routing and switching device writes all the data slices of the data packet into the null and continuous data slice row addresses.

3. The method according to claim 2, further comprising:
the routing and switching device, when receiving a read operation, reading the data packet from the exterior cache and updating the data caching state of the exterior cache according to the packet information of the data packet to be read and the written data slice row addresses.

4. The method according to claim 3, wherein:
in the step of reading the data packet from the exterior cache, the routing and switching device reads the data slices of the data packet by continuous burst read operations, wherein, when the number of data slices of the data packet exceeds the maximum number of continuous burst read operations, the routing and switching device reads out all the data slices of the data packet for one time, and when reading data next time, subtracts the number of burst read operations which exceed the maximum number of continuous burst read operations in the process of the current reading data.

5. The method according to claim 1, further comprising:
the routing and switching device, when receiving a read operation, reading the data packet from the exterior cache and updating the data caching state of the exterior cache according to the packet information of the data packet to be read and the written data slice row addresses.

6. The method according to claim 5, wherein:
in the step of reading the data packet from the exterior cache, the routing and switching device reads the data slices of the data packet by continuous burst read operations, wherein, when the number of data slices of the data packet exceeds the maximum number of continuous burst read operations, the routing and switching device reads out all the data slices of the data packet for one time, and when reading data next time, subtracts the number of burst read operations which exceed the maximum number of continuous burst read operations in the process of the current reading data.

7. A routing and switching device, comprising a processor and a storage device, wherein the storage device stores processor-executable programs, and the programs comprise a caching control module and a data caching list module, wherein:

the caching control module is configured to: when receiving a data packet, if inquiring that a data caching state of an exterior cache is that there are data slice row addresses not fully filled and continuous space in the data slice row addresses not fully filled is enough to store all the data slices of the data packet, then write all the data slices of the data packet into the data slice row addresses not fully filled, and sending packet information of the data packet and the written data slice row addresses to the data caching list module; and the data caching list module is configured to: store the packet information of the data packet and the written data slice row addresses which are written into the exterior cache and sent by the caching control module, and update the data caching state of the exterior cache in real time, wherein:

the caching control module is configured to: continuously write the data slices of the data packet into the data slice row addresses by continuous burst read operations, wherein, when the number of data slices of the data packet exceeds the maximum number of continuous burst write operations, the caching control module carries out burst write operations according to the maximum number of continuous burst write operations in the process of writing data each time, until all the data slices of the data are written into.

8. The device according to claim 7, wherein:

the caching control module is configured to: if inquiring the data caching state of the exterior cache is that there are null and continuous data slice row addresses, then write all the data slices of the data packet into the null and continuous data slice row addresses.

9. The device according to claim 8, wherein:

the caching control module is configured to: when receiving a read operation, inquire for the packet information of the data packet to be read and the written data slice row addresses from the data caching list module, read the data packet from the exterior cache, and send a reading result to the data caching list module; and the data caching list module is further configured to: receive the reading result sent by the caching control module, and update the data caching state of the exterior cache according to the reading result.

10. The device according to claim 9, wherein:

the caching control module is configured to: read the data slices of the data packet by continuous burst read operations, wherein, when the number of data slices of the data packet exceeds the maximum number of continuous burst read operations, the caching control module reads out all the data slices of the data packet for one time, and when reading data next time, subtracts the number of burst read operations which exceed the maximum number of continuous burst read operations in the process of the current reading data.

11. The device according to claim 7, wherein:

the caching control module is configured to: when receiving a read operation, inquire for the packet information of the data packet to be read and the written data slice row addresses from the data caching list module, read the data packet from the exterior cache, and send a reading result to the data caching list module; and the data caching list module is further configured to: receive the reading result sent by the caching control module, and update the data caching state of the exterior cache according to the reading result.

12. The device according to claim 11, wherein:

the caching control module is configured to: read the data slices of the data packet by continuous burst read operations, wherein, when the number of data slices of the data packet exceeds the maximum number of continuous burst read operations, the caching control module reads out all the data slices of the data packet for one time, and when reading data next time, subtracts the number of burst read operations which exceed the maximum number of continuous burst read operations in the process of the current reading data.

* * * * *